United States Patent
Carasso et al.

(10) Patent No.: US 11,775,548 B1
(45) Date of Patent: *Oct. 3, 2023

(54) SELECTION OF REPRESENTATIVE DATA SUBSETS FROM GROUPS OF EVENTS

(71) Applicant: SPLUNK INC., San Francisco, CA (US)

(72) Inventors: R. David Carasso, San Rafael, CA (US); Micah James Delfino, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,073

(22) Filed: Jan. 5, 2022

Related U.S. Application Data

(63) Continuation of application No. 16/751,063, filed on Jan. 23, 2020, now Pat. No. 11,232,124, which is a
(Continued)

(51) Int. Cl.
*G06F 16/25* (2019.01)
*G06F 16/35* (2019.01)
(Continued)

(52) U.S. Cl.
CPC .......... *G06F 16/254* (2019.01); *G06F 3/0482* (2013.01); *G06F 3/04842* (2013.01);
(Continued)

(58) Field of Classification Search
CPC .. G06F 16/254; G06F 3/0482; G06F 3/04842; G06F 7/24; G06F 16/287; G06F 16/35; G06F 16/904; G06F 3/0488
See application file for complete search history.

(56) References Cited

U.S. PATENT DOCUMENTS 5,263,120 A    11/1993   Bickel
5,446,878 A    8/1995   Royal
(Continued)

OTHER PUBLICATIONS

Aho, Alfred V. et al., "Columbia Digital News Project: An Environment For Briefing And Search Over Multimedia Information," International Journal on Digital Libraries, vol. 1, pp. 377-385, 1997.
(Continued)

*Primary Examiner* — Pei Yong Weng
(74) *Attorney, Agent, or Firm* — Perkins Coie LLP

(57) ABSTRACT

Embodiments are directed towards generating a representative sampling as a subset from a larger dataset that includes unstructured data. A graphical user interface enables a user to provide various data selection parameters, including specifying a data source and one or more subset types desired, including one or more of latest records, earliest records, diverse records, outlier records, and/or random records. Diverse and/or outlier subset types may be obtained by generating clusters from an initial selection of records obtained from the larger dataset. An iteration analysis is performed to determine whether a sufficient number of clusters and/or cluster types have been generated that exceed at least one threshold and when not exceeded, additional clustering is performed on additional records. From the resultant clusters, and/or other subtype results, a subset of records is obtained as the representative sampling subset.

17 Claims, 9 Drawing Sheets

Related U.S. Application Data continuation of application No. 15/421,406, filed on Jan. 31, 2017, now Pat. No. 10,585,910, which is a continuation of application No. 14/700,006, filed on Apr. 29, 2015, now Pat. No. 9,582,557, which is a continuation of application No. 14/168,888, filed on Jan. 30, 2014, now Pat. No. 9,031,955, which is a continuation of application No. 13/747,153, filed on Jan. 22, 2013, now Pat. No. 8,751,499.

(51) Int. Cl.
*G06F 16/28* (2019.01)
*G06F 16/904* (2019.01)
*G06F 7/24* (2006.01)
*G06F 3/0482* (2013.01)
*G06F 3/04842* (2022.01)
*G06F 3/0488* (2022.01)

(52) U.S. Cl.
CPC .............. *G06F 7/24* (2013.01); *G06F 16/287* (2019.01); *G06F 16/35* (2019.01); *G06F 16/904* (2019.01); *G06F 3/0488* (2013.01)

(56) References Cited

U.S. PATENT DOCUMENTS

| | | |
|---|---|---|
| 5,550,971 A | 8/1996 | Brunner et al. |
| 6,049,777 A | 4/2000 | Sheena et al. |
| 6,112,185 A | 8/2000 | Walker et al. |
| 6,112,186 A | 8/2000 | Bergh et al. |
| 6,118,936 A | 9/2000 | Lauer et al. |
| 6,335,927 B1 | 1/2002 | Elliott et al. |
| 6,374,251 B1 | 4/2002 | Fayyad et al. |
| 6,487,677 B1 | 11/2002 | Jantz et al. |
| 6,609,128 B1 | 8/2003 | Underwood |
| 6,694,362 B1 | 2/2004 | Secor et al. |
| 6,718,535 B1 | 4/2004 | Underwood |
| 6,954,756 B2 | 10/2005 | Arning et al. |
| 7,100,195 B1 | 8/2006 | Underwood |
| 7,136,880 B2 | 11/2006 | Wilkins et al. |
| 7,145,898 B1 | 12/2006 | Elliott |
| 7,389,306 B2 | 6/2008 | Schuetze et al. |
| 7,562,069 B1 | 7/2009 | Chowdhury et al. |
| 7,644,414 B2 | 1/2010 | Smith et al. |
| 7,650,512 B2 | 1/2010 | Karimisetty et al. |
| 7,805,482 B2 | 9/2010 | Schiefer |
| 7,958,164 B2 | 6/2011 | Ivanov et al. |
| 8,022,987 B2 | 9/2011 | Ko et al. |
| 8,121,973 B2 | 2/2012 | Anderson et al. |
| 8,200,506 B2 | 6/2012 | Kil |
| 8,412,696 B2 | 4/2013 | Zhang et al. |
| 8,442,950 B2 | 5/2013 | D et al. |
| 8,442,982 B2 | 5/2013 | Jacobson et al. |
| 8,458,612 B2 | 6/2013 | Chatterjee et al. |
| 8,516,008 B1 | 8/2013 | Marquardt et al. |
| 8,543,379 B1 | 9/2013 | Michelsen |
| 8,589,403 B2 | 11/2013 | Marquardt et al. |
| 8,682,925 B1 | 3/2014 | Marquardt et al. |
| 8,700,658 B2 | 4/2014 | Rambhia et al. |
| 8,713,000 B1 | 4/2014 | Elman et al. |
| 8,751,855 B2 | 6/2014 | Yairi et al. |
| 8,762,951 B1 | 6/2014 | Kosche et al. |
| 10,387,448 B2 | 8/2019 | Xu et al. |
| 2002/0049740 A1 | 4/2002 | Arning et al. |
| 2002/0054101 A1 | 5/2002 | Beatty |
| 2002/0133513 A1 | 9/2002 | Townsend et al. |
| 2003/0061212 A1 | 3/2003 | Smith et al. |
| 2003/0073917 A1 | 4/2003 | Echauz et al. |
| 2003/0120475 A1 | 6/2003 | Nakamura |
| 2003/0167192 A1 | 9/2003 | Santos et al. |
| 2003/0187821 A1 | 10/2003 | Cotton et al. |
| 2004/0010497 A1 | 1/2004 | Bradley et al. |
| 2004/0078359 A1 | 4/2004 | Bolognese et al. |
| 2004/0148154 A1 | 7/2004 | Acero et al. |
| 2004/0148170 A1 | 7/2004 | Acero et al. |
| 2004/0220965 A1 | 11/2004 | Harville et al. |
| 2004/0225641 A1 | 11/2004 | Dettinger et al. |
| 2005/0022207 A1 | 1/2005 | Grabarnik et al. |
| 2005/0060647 A1 | 3/2005 | Doan et al. |
| 2005/0065967 A1 | 3/2005 | Schuetze et al. |
| 2005/0160086 A1 | 7/2005 | Haraguchi et al. |
| 2005/0203876 A1 | 9/2005 | Cragun et al. |
| 2005/0235356 A1 | 10/2005 | Wang |
| 2005/0251532 A1 | 11/2005 | Radhakrishnan et al. |
| 2005/0283354 A1 | 12/2005 | Ouimet |
| 2006/0053174 A1 | 3/2006 | Gardner et al. |
| 2006/0065967 A1 | 3/2006 | Lehner |
| 2006/0074621 A1 | 4/2006 | Rachman |
| 2006/0112123 A1 | 5/2006 | Clark et al. |
| 2006/0136194 A1 | 6/2006 | Armstrong et al. |
| 2006/0143159 A1 | 6/2006 | Chowdhury et al. |
| 2006/0155581 A1 | 7/2006 | Eisenberger et al. |
| 2006/0161564 A1 | 7/2006 | Pierre et al. |
| 2006/0173917 A1 | 8/2006 | Kalmick et al. |
| 2006/0253423 A1 | 11/2006 | McLane et al. |
| 2006/0253790 A1 | 11/2006 | Ramarajan et al. |
| 2006/0259519 A1 | 11/2006 | Yakushev et al. |
| 2006/0259619 A1 | 11/2006 | Chang et al. |
| 2006/0265397 A1 | 11/2006 | Bryan et al. |
| 2006/0293979 A1 | 12/2006 | Cash et al. |
| 2007/0003146 A1 | 1/2007 | Ko et al. |
| 2007/0118491 A1 | 5/2007 | Baum et al. |
| 2007/0177689 A1 | 8/2007 | Beadle et al. |
| 2007/0198565 A1 | 8/2007 | Ivanov et al. |
| 2007/0209080 A1 | 9/2007 | Delgado et al. |
| 2007/0214134 A1 | 9/2007 | Haselden et al. |
| 2007/0214164 A1 | 9/2007 | MacLennan et al. |
| 2007/0239694 A1 | 10/2007 | Singh et al. |
| 2008/0021748 A1 | 1/2008 | Bay et al. |
| 2008/0104542 A1 | 5/2008 | Cohen et al. |
| 2008/0208820 A1 | 8/2008 | Usey et al. |
| 2008/0222125 A1 | 9/2008 | Chowdhury |
| 2008/0228093 A1 | 9/2008 | Dong et al. |
| 2008/0249858 A1 | 10/2008 | Angell et al. |
| 2008/0270366 A1 | 10/2008 | Frank |
| 2008/0291030 A1 | 11/2008 | Pape et al. |
| 2008/0297513 A1 | 12/2008 | Greenhill et al. |
| 2008/0301095 A1 | 12/2008 | Zhu et al. |
| 2008/0301135 A1 | 12/2008 | Alves et al. |
| 2008/0306980 A1 | 12/2008 | Brunner et al. |
| 2008/0320033 A1 | 12/2008 | Koistinen et al. |
| 2009/0037311 A1 | 2/2009 | Omar |
| 2009/0070784 A1 | 3/2009 | Schmidt et al. |
| 2009/0070786 A1 | 3/2009 | Alves et al. |
| 2009/0083759 A1 | 3/2009 | Keil et al. |
| 2009/0094207 A1 | 4/2009 | Marvit et al. |
| 2009/0125916 A1 | 5/2009 | Lu et al. |
| 2009/0177689 A1 | 7/2009 | Song et al. |
| 2009/0199118 A1 | 8/2009 | Sabato et al. |
| 2009/0287628 A1 | 11/2009 | Indeck et al. |
| 2009/0287680 A1 | 11/2009 | Paek et al. |
| 2009/0300065 A1 | 12/2009 | Birchall |
| 2009/0319512 A1 | 12/2009 | Baker et al. |
| 2009/0327319 A1 | 12/2009 | Bertram et al. |
| 2010/0015211 A1 | 1/2010 | Barnett et al. |
| 2010/0017390 A1 | 1/2010 | Yamasaki et al. |
| 2010/0095018 A1 | 4/2010 | Khemani et al. |
| 2010/0106743 A1 | 4/2010 | Brunner et al. |
| 2010/0138377 A1 | 6/2010 | Wright et al. |
| 2010/0223499 A1 | 9/2010 | Panigrahy et al. |
| 2010/0229096 A1 | 9/2010 | Maiocco et al. |
| 2010/0229112 A1 | 9/2010 | Ergan et al. |
| 2010/0250497 A1 | 9/2010 | Redlich et al. |
| 2010/0251100 A1 | 9/2010 | Delacourt |
| 2010/0256994 A1 | 10/2010 | Eisenberger et al. |
| 2010/0275128 A1 | 10/2010 | Ward et al. |
| 2010/0306281 A1 | 12/2010 | Williamson |
| 2010/0324925 A1* | 12/2010 | Barkan ................ G16H 40/20 705/2 |
| 2011/0010685 A1 | 1/2011 | Sureka et al. |
| 2011/0029817 A1 | 2/2011 | Nakagawa et al. |
| 2011/0035345 A1 | 2/2011 | Duan et al. |
| 2011/0040724 A1 | 2/2011 | Dircz |

(56) References Cited

U.S. PATENT DOCUMENTS

| | | |
|---|---|---|
| 2011/0066585 A1 | 3/2011 | Subrahmanyam et al. |
| 2011/0099500 A1 | 4/2011 | Smith et al. |
| 2011/0126128 A1 | 5/2011 | McKenzie et al. |
| 2011/0185230 A1 | 7/2011 | Agrawal et al. |
| 2011/0208592 A1 | 8/2011 | Golder |
| 2011/0219035 A1 | 9/2011 | Korsunsky et al. |
| 2011/0231223 A1 | 9/2011 | Winters |
| 2011/0246528 A1 | 10/2011 | Hsieh et al. |
| 2011/0276695 A1 | 11/2011 | Maldaner |
| 2011/0313844 A1 | 12/2011 | Chandramouli et al. |
| 2011/0320450 A1 | 12/2011 | Liu et al. |
| 2012/0023429 A1 | 1/2012 | Medhi |
| 2012/0051644 A1 | 3/2012 | Das et al. |
| 2012/0064969 A1 | 3/2012 | Uchibori et al. |
| 2012/0079363 A1 | 3/2012 | Folting et al. |
| 2012/0089562 A1 | 4/2012 | Deremigio et al. |
| 2012/0101975 A1 | 4/2012 | Khosravy |
| 2012/0117079 A1 | 5/2012 | Baum et al. |
| 2012/0117116 A1 | 5/2012 | Jacobson et al. |
| 2012/0137367 A1 | 5/2012 | Dupont et al. |
| 2012/0204886 A1 | 8/2012 | Li |
| 2012/0221559 A1 | 8/2012 | Kidron |
| 2012/0221715 A1 | 8/2012 | Hamada |
| 2012/0226779 A1 | 9/2012 | Crucs |
| 2012/0254337 A1 | 10/2012 | Fake et al. |
| 2012/0283948 A1 | 11/2012 | Demiryurek et al. |
| 2012/0296876 A1 | 11/2012 | Bacinschi et al. |
| 2012/0311467 A1 | 12/2012 | Bijani et al. |
| 2013/0007645 A1 | 1/2013 | Kurniawan et al. |
| 2013/0019019 A1 | 1/2013 | Lam |
| 2013/0030907 A1 | 1/2013 | Lyon |
| 2013/0041824 A1 | 2/2013 | Gupta |
| 2013/0054642 A1 | 2/2013 | Morin |
| 2013/0054660 A1 | 2/2013 | Zhang |
| 2013/0060912 A1 | 3/2013 | Rensin et al. |
| 2013/0060937 A1 | 3/2013 | Bath et al. |
| 2013/0073542 A1 | 3/2013 | Zhang et al. |
| 2013/0073573 A1 | 3/2013 | Huang et al. |
| 2013/0073957 A1 | 3/2013 | Digiantomasso et al. |
| 2013/0080190 A1 | 3/2013 | Mansour et al. |
| 2013/0080541 A1 | 3/2013 | Herbert |
| 2013/0080641 A1 | 3/2013 | Lui et al. |
| 2013/0103409 A1 | 4/2013 | Malkin et al. |
| 2013/0117852 A1 | 5/2013 | Stute |
| 2013/0138459 A1 | 5/2013 | Barkan et al. |
| 2013/0144863 A1 | 6/2013 | Mayer et al. |
| 2013/0162700 A1 | 6/2013 | Yamakawa |
| 2013/0173322 A1 | 7/2013 | Gray |
| 2013/0179029 A1 | 7/2013 | Wang et al. |
| 2013/0182700 A1 | 7/2013 | Figura et al. |
| 2013/0232094 A1 | 9/2013 | Anderson et al. |
| 2013/0262371 A1 | 10/2013 | Nolan |
| 2013/0297767 A1 | 11/2013 | Kozine et al. |
| 2013/0318236 A1 | 11/2013 | Coates et al. |
| 2013/0318603 A1 | 11/2013 | Merza |
| 2013/0326620 A1 | 12/2013 | Merza et al. |
| 2014/0019909 A1 | 1/2014 | Leonard et al. |
| 2014/0046976 A1 | 2/2014 | Zhang et al. |
| 2014/0074764 A1 | 3/2014 | Duftler et al. |
| 2014/0081685 A1 | 3/2014 | Thacker et al. |
| 2014/0236889 A1 | 8/2014 | Vasan et al. |
| 2014/0236890 A1 | 8/2014 | Vasan et al. |
| 2014/0324862 A1 | 10/2014 | Bingham et al. |
| 2014/0325058 A1 | 10/2014 | Fletcher et al. |
| 2015/0019537 A1 | 1/2015 | Neels et al. |
| 2015/0149879 A1 | 5/2015 | Miller et al. |
| 2015/0154269 A1 | 6/2015 | Miller et al. |

OTHER PUBLICATIONS

Apple, "iTunes 10 For Mac: Create A Smart Playlist," 1 page, Nov. 27, 2012.

Bass, William M. et al., "Examining Geographic Visualization As A Technique For Individual Risk Assessment," Applied Geography, vol. 31, pp. 53-63, 2011.

Bitincka, Ledion et al., "Optimizing Data Analysis With A Semi-Structured Time Series Database," Proceedings of the 2010 Workshop on Managing Systems Via Log Analysis and Machine Learning Techniques, 9 pages, 2010.

Carasso, David, "Field Extractor App (WALKTHROUGH) // Splunk," 2 pages, Jul. 12, 2013.

Carasso, David, "Semi-Automatic Discovery Of Extraction Patterns For Log Analysis," 3 pages, 2007.

Carter, Sam et al., "Intelligent Event Identification System" vol. 3, Software Maintenance Manual, 1 page, Nov. 1991.

Just Great Software Co. Ltd., "RegexBuddy Demo—Self-Running Demonstration," 2 pages, 2013.

Kalmanek, Charles R. et al., "Darkstar: Using Exploratory Data Mining To Raise The Bar On Network Reliability And Performance," 7th International Workshop on Design of Reliable Communication Networks, 10 pages, Oct. 25-28, 2009.

Patel, Dynal et al., "An Evaluation Of Techniques For Image Searching And Browsing On Mobile Devices," ACM, pp. 60-69, 2009.

Riloff, Ellen et al., "Learning Dictionaries For Information Extraction By Multi-Level Bootstrapping," Proceedings of the 16th National Conference on Artificial Intelligence, 6 pages, 1999.

Soderland, Stephen et al., "Issues In Inductive Learning Of Domain-Specific Text Extraction Rules," Workshop on New Approaches to Learning for Natural Language Processing, 6 pages, 1995.

Splunk Inc., "Build A Data Model," Splunk Enterprise 6.1.3 Knowledge Manager Manual, 58 pages, 2014.

Splunk Inc., "Incident Review Dashboard," Version 2.1.1, http://docs.splunk.com/Documentation/PCI/2.1.1/User/IncidentReviewdashboard, 2 pages, 2015.

Splunk Inc., "Pivot Manual," Splunk Enterprise 6.1.3, 30 pages, 2014.

Tong, Hanghang et al., "Fast Mining Of Complex Time-Stamped Events," Proceedings of the 17th ACM Conference on Information and Knowledge Management, pp. 759-768, Oct. 26-30, 2008.

VSphere Monitoring And Performance, Update 1, vSphere 5.5, EN-001357-02, VMware, Inc., retrieved online from url: http://pubs.vmware.com/vsphere-55/topic/com.vmware.ICbase/PDF/vsphere-esxi-vcenter-server-551-monitoring-performance-guide.pdf, 2014, pp. 1-174.

Wang, Miao et al., "Event Indexing And Search For High Volumes Of Event Streams In The Cloud," 36th International Conference on Computer Software and Applications, pp. 405-415, 2012.

Wikipedia, "Cluster Analysis," 6 pages, Jan. 18, 2015.

Carasso, David , "Exploring Splunk—Search Processing Lanaguage (SPL) Primer And Cookbook", Apr. 2012, 156 Pages.

* cited by examiner

SELECTION OF REPRESENTATIVE DATA SUBSETS FROM GROUPS OF EVENTS

CROSS-REFERENCE AND RELATED APPLICATIONS

This application is a continuation of U.S. patent application Ser. No. 16/751,063, title "SELECTION OF A REPRESENTATIVE DATA SUBSET OF A SET OF UNSTRUCTURED DATA", filed on Jan. 23, 2020, which is a continuation of U.S. patent application Ser. No. 15/421,406, titled "MANAGING SELECTION OF A REPRESENTATIVE DATA SUBSET ACCORDING TO USER-SPECIFIED PARAMETERS WITH CLUSTERING", filed on Jan. 31, 2017, now U.S. Pat. No. 10,585,910 issued on Mar. 10, 2020, which is a continuation of U.S. patent application Ser. No. 14/700,006, titled "SAMPLING EVENTS FOR RULE CREATION WITH PROCESS SELECTION", filed on Apr. 29, 2015, now U.S. Pat. No. 9,582,557 issued on Feb. 28, 2017, which is a continuation of U.S. patent application Ser. No. 14/168,888, titled "SAMPLING OF EVENTS TO USE FOR DEVELOPING A FIELD-EXTRACTION RULE FOR A FIELD TO USE IN EVENT SEARCHING", filed on Jan. 30, 2014, now U.S. Pat. No. 9,031,955 issued on May 12, 2015; which is a continuation of U.S. patent application Ser. No. 13/747,153, titled "VARIABLE REPRESENTATIVE SAMPLING UNDER RESOURCE CONSTRAINTS", filed on Jan. 22, 2013, now U.S. Pat. No. 8,751,499 issued on Jun. 10, 2014, each of which is incorporated by reference herein in their entirely.

TECHNICAL FIELD

The subject innovations relate generally to data sampling and more particularly, but not exclusively to generating a variable representative sampling of data as a subset from a larger dataset that includes unstructured data.

BACKGROUND

The rapid increase in the production and collection of machine-generated data has created large data sets that are difficult to search and/or otherwise analyze. The machine data can include sequences of time stamped records that may occur in one or more usually continuous streams. Further, machine data often represents activity made up of discrete records or events.

Often, search engines may receive raw data from various data sources, including machine data. In some cases, search engines may be configured to transform raw data in various ways prior to storing it. At least one of the transformations may include extracting field values from the raw data. Sometimes the raw data may be unstructured; this may make it difficult for systems to efficiently analyze the data to determine what data may be included in the raw data and/or how to generate a field value extraction rule. This may be especially true where the datasets are considered extremely large, such as in the terabytes or greater. Such large unstructured datasets may make it difficult and time consuming to analyze the data so as to be able to perform various actions on the data. For example, determining extraction rules, modification rules, or the like on such large datasets that are correct and effective may be difficult and time consuming. Improper and/or ineffective rules may result in improper values from the raw data and/or omit significant values.

Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
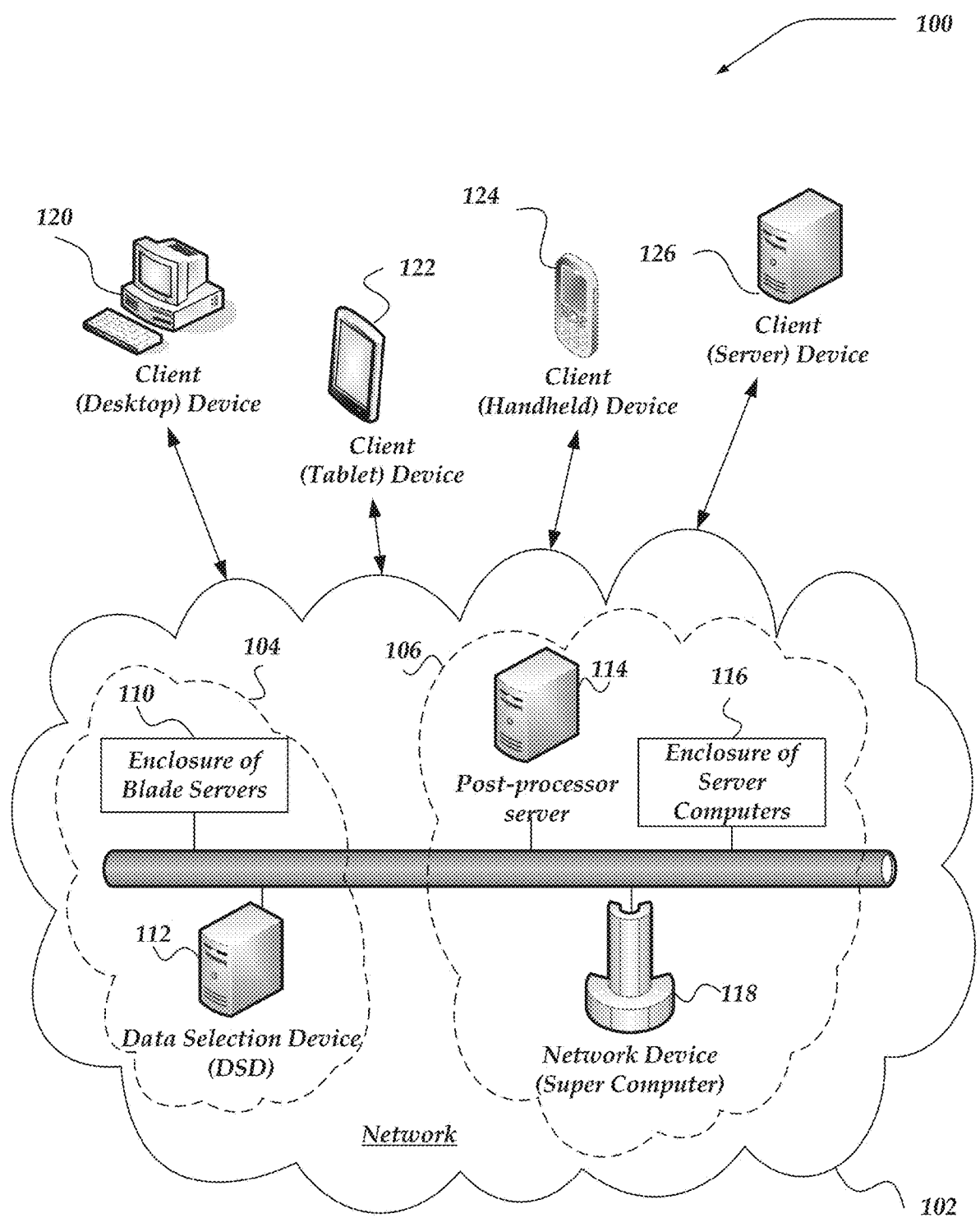
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the subject innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the subject innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "machine data" as used herein may include server logs and other types of machine data (i.e., data generated by machines). In at least one of the various embodiments, machine data streams may be time stamped to create time stamped events. For example, information processing environments, such as, firewalls, routers, web servers, application servers and databases may generate streams of time series data in the form of events. In some cases, events may be generated hundreds or thousands of times per second.

The term "unstructured data" as used herein refers to data that either does not have a pre-defined data model and/or does not fit well into relational tables. Unstructured data sometimes may be text-heavy in that the data might be predominately alpha data, which may be of various lengths. However, some embodiments of unstructured data may include numeric data, as well. Moreover, unstructured data may be absent of at least some field headers, tags, labels, or the like, that indicate a format and/or type of data within a field or portion of the data.

The term "time series data" as used herein is data where each data record has a timestamp associated with it. A "Time Series Search Engine" is a search engine which, in at least one of the various embodiments, can perform queries limited by a time range (such as between one time and another, or data earlier than a given time, or the like) on the stored data and/or generate results ordered by time and/or timestamps (such as from earliest-to-latest or vice versa).

The terms "data repository" and "data store" as used herein refer to data sources that may contain unstructured or structured data, such as databases, file systems, search engine indexes, or the like. In at least one of the various embodiments, a data repository may be a live stream of data. In other cases, a data repository may be static data, or a combination of live data or static data. In at least one of the various embodiments, data repositories may provide interfaces such as, application programming interfaces (API) for receiving requests, queries regarding the data stored in the data repository.

The term "configuration information" as used herein refers to data and/or directives that may be employed by an application for performing action, such as indexing, transforming, and/or interpreting raw data received from data sources. Configuration information may be saved using various storage mechanisms, such as, file systems, databases, computer memory, or the like.

Configuration information may include rules and/or criteria that may be comprised of extraction rules, filters, matching functions, rules for determining "event boundaries" within raw data (e.g., rules for dividing an event stream into individual lines, rules for merging lines into multi-line events, or the like), rules for locating and parsing timestamps in raw data, or the like. The configuration information may be employed by an application to identify events of interest that may be included in machine-generated data, identify and extract fields within events, or the like.

The term "raw data" as used herein refers to data before it is processed by an indexer application or a previewing application. In at least one of the various embodiments, the raw data may be machine-generated data. Indexer applications and previewing applications may use the configuration information to determine how to interpret the raw data.

The term "extraction rule" as used herein refers to configuration information that may be applied to identify and extract field values from data.

The following briefly describes the embodiments of the subject innovations in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards identifying a variable representative sampling of data as a subset from a larger dataset that includes unstructured data. The larger dataset may also include structured data. Machine data is received in the form of records having columns, which may have more than one value, and/or type of data. Such machine data is typically unstructured data and may include terabytes of data. One or more subsets of the data are selected based on one or more criteria, to generate a representation of the larger dataset. It is anticipated that by operating on subsets of the data as representatives of the larger dataset time and resources may be conserved over operating on the entire larger dataset.

The data selection may be performed within a standalone system that receives the dataset and generates the representative subset, or can be part of a larger system that may include performing other actions, including, using the representative subset to form extraction rules for use over the larger dataset or portion thereof, to form rules usable to modify portions of the larger dataset, including anonymizing portions of the subset and/or the larger dataset, to perform subset analysis, and/or to perform any of a variety of other actions.

A graphical user interface is provided that enables a user to provide various data selection parameters, including specifying data source types, specifying one or more subset types desired, and/or other criteria. The desired subset types may include latest records, earliest records, diverse records, outlier records, random records, and/or combinations thereof. Other subset types are also envisaged, and therefore, the subject innovations described herein are not limited to this non-exhaustive list of subset types.

Diverse and/or outlier subset types may be obtained by performing any of a variety of unsupervised clustering approaches to generate clusters from an initial selection of records obtained from the larger dataset. A cluster iteration analysis is performed to determine whether a sufficient number of clusters and/or cluster types have been generated that exceed at least one threshold. When it is determined that an insufficient number of clusters or cluster types have been generated, additional records are selected from the larger dataset and the unsupervised clustering approach is repeated. From resultant clusters, a subset of records are obtained that are identified as a representative sampling (subset) of the larger dataset.

Combinations of selected subset types may also be used to generate a resultant representative sampling of the larger dataset by combining at least some of the records obtained from two or more of the subset type processes. In this manner, the resultant representative sampling may allow testing of various hypotheses, performing of automated tasks such as validating pattern matching analysis, or the like. Other actions may also be performed.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the subject innovations.

In at least one embodiment, cloud network 102 enables one or more network services for a user based on the operation of corresponding arrangements 104 and 106 of virtually any type of networked computing device or devices. As shown, the networked computing devices may include data selection device (DSD) 112, post-processor server 114, enclosure of blade servers 110, enclosure of server computers 116, super computer network device 118, and the like. In some embodiments, one or more client devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, server client device 126, desktop client device 120, and the like. In various embodiments, the user may also employ notebook computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable and/or non-portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for client devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a client device to wirelessly access a network service through a combination of several radio network access technologies such as GSM, EDGE, SMS, HSDPA, LTE and the like.

Enclosure of Blade Servers

Figure 2A:
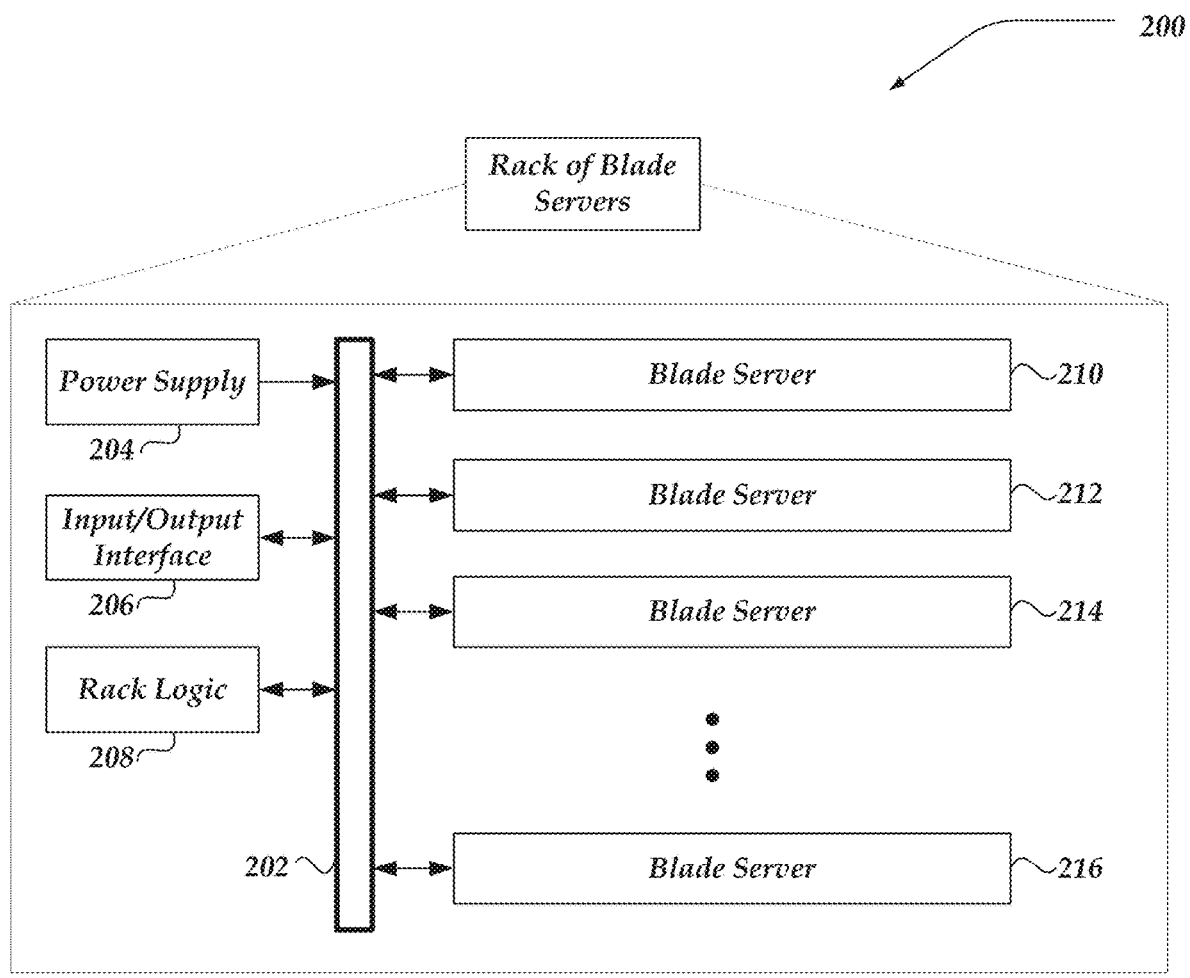
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. In some embodiments, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
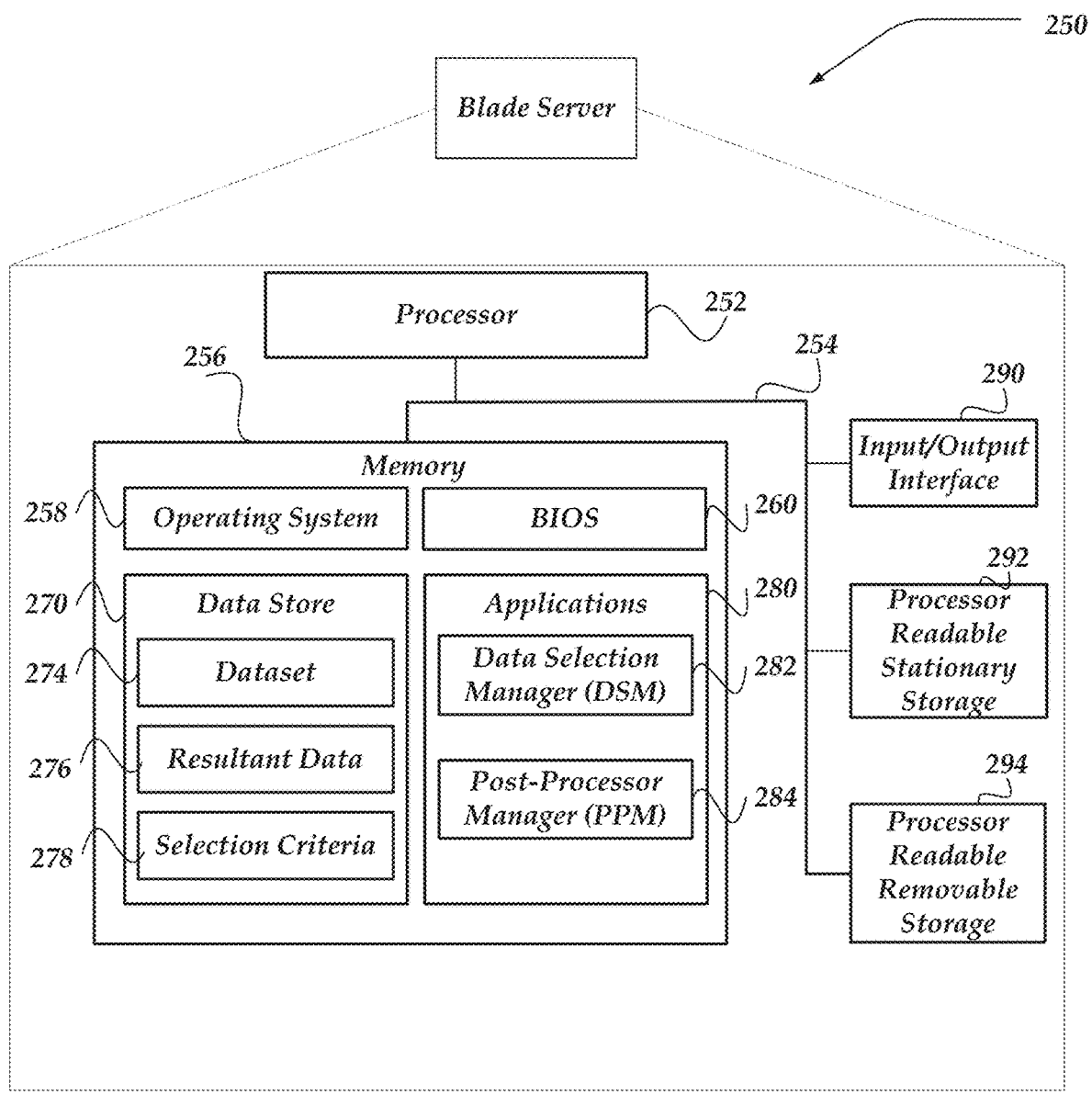
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, client devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™ and Apple Computer's IOS Server™, or the like.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, dataset 274, resultant data 276, or selection criteria 278, which are described in more detail below in conjunction with FIG. 4.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Data Selection Manager (DSM) 282, and Post-Processor Manager (PPM) 284, which are described in more detail below in conjunction with FIGS. 4-5.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
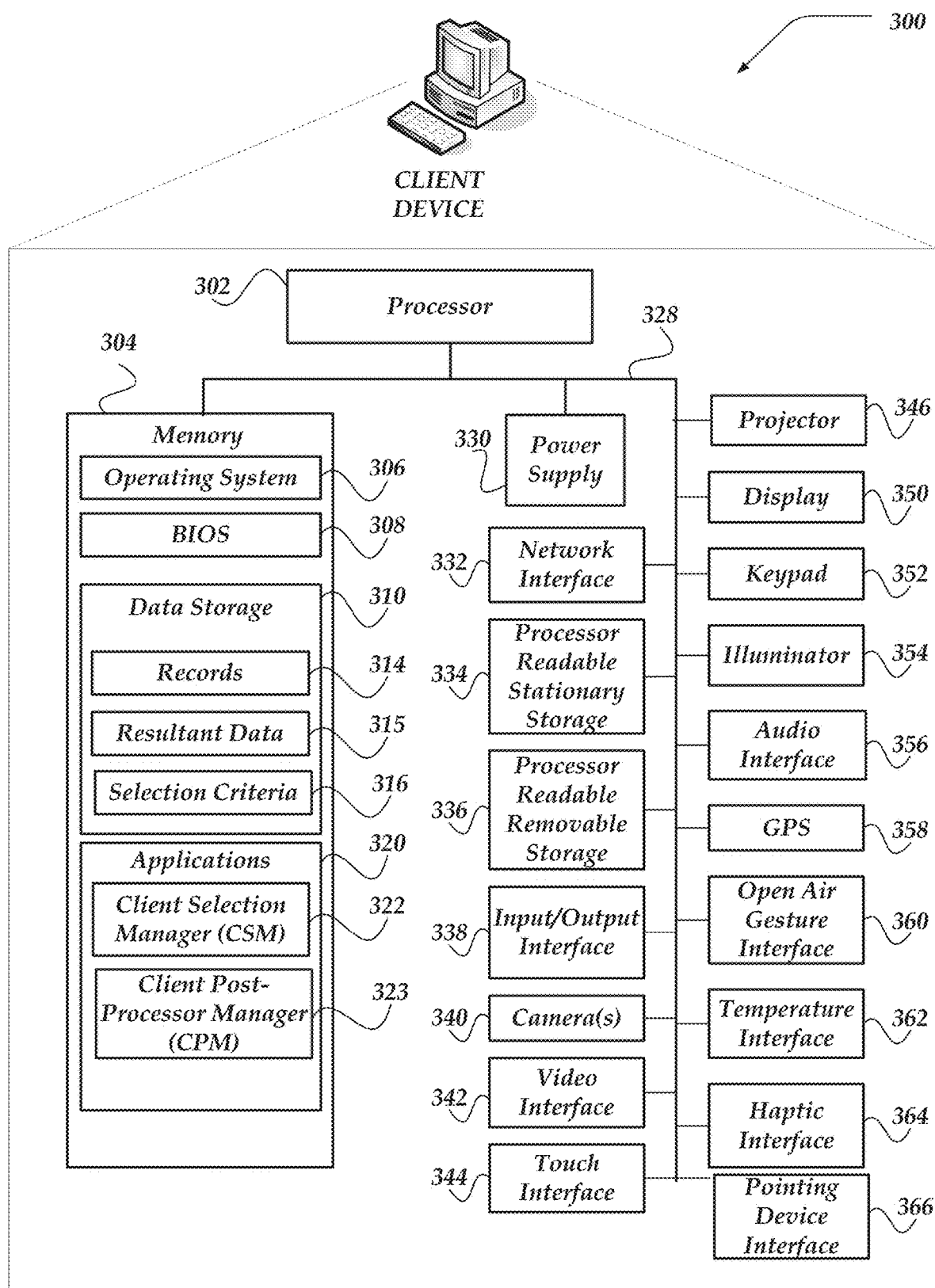
FIG. 3 shows a schematic embodiment of a client device such as that shown in FIG. 1.

FIG. 3 shows one embodiment of client device 300 that may include many more or less components than those shown. Client device 300 may represent, for example, at least one embodiment of client devices shown in FIG. 1.

Client device 300 includes processor 302 in communication with memory 304 via bus 328. Client device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to client device 300. A rechargeable or non-rechargeable battery may be used to provide power. The power may also be provided by an external power source, such as an AC adapter or a powered docking cradle that supplements and/or recharges the battery. And in one embodiment, a gyroscope may be employed within client device 300 to measuring and/or maintaining an orientation of client device 300.

Client device 300 may optionally communicate with a base station (not shown), or directly with another computing device. Network interface 332 includes circuitry for coupling client device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), Web Access Protocol (WAP), ultra wide band (UWB), IEEE 802.16 Worldwide Interoperability for Microwave Access (WiMax), Session Initiation Protocol/Real-time Transport Protocol (SIP/RTP), General Packet Radio Services (GPRS), Enhanced Data GSM Environment (EDGE), Wideband Code Division Multiple Access (WCDMA), Long Term Evolution Advanced (LTE), Universal Mobile Telecommunications System (UMTS), Orthogonal frequency-division multiplexing (OFDM), Code Division Multiple Access 2000 (CDMA2000), Evolution-Data Optimized (EV-DO), High-Speed Downlink Packet Access (HSDPA), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 also comprises input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of client device 300. The memory also stores an operating system 306 for controlling the operation of client device 300. It will be appreciated that this component may include a general-purpose operating system such as a version of UNIX, or LINUX™, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device. Data storage 310 may include, for example, records 314 that may include a subset of data that may be sent, or otherwise be combined with data from one or more other sources to generate a larger dataset. At least some of records 314 may include machine data that includes unstructured data. Data storage 310 may also include resultant data 315 obtained as a representative sampling of a larger dataset, and selection criteria 316 that represents various parameters useable to generate the resultant data 315 from the larger dataset. It should be understood that while records 314, resultant data 315, and selection criteria 316 are illustrated as residing on client device 300, the subject innovations are not so limited. Thus, in other embodiments some or all of these components might reside completely, or in part, on a remote computing device.

Applications 320 may include computer executable instructions which, when executed by client device 300, transmit, receive, and/or otherwise process instructions and data. Applications 320 may include, for example, client selection manager (CSM) 322 and client post-processor manager (CPM) 323.

In some embodiments, CSM 322 is configured to provide a user interface to applications operating on a remote computing device that allows a user to generate variable representative sampling subsets from a larger dataset. CSM 322 may, in other embodiments, operate as a standalone application residing within client device 300 to provide substantially similar functionality as might be provided by the applications operating on the remote computing device. In either configuration, CSM 322 operate on data obtained from a remote device, and/or records 314, using selection criteria 316, to generate resultant data 315.

CPM 323 is configured to enable a user to perform post-processing operations on resultant data 315, on at least some of records 314, and/or upon data obtained from any of a variety of other sources. Operations performed using CSM 322 and CPM 323 are described in more detail below in conjunction with FIG. 5's discussion regarding a data selection manager 282, and post-processor manager 284.

Other examples of application programs include calendars, search programs, email client applications, IM applications, SMS applications, Voice over Internet Protocol (VOIP) applications, contact managers, task managers, transcoders, database programs, word processing programs, security applications, spreadsheet programs, games, search programs, and so forth.

Illustrative Network Device

Figure 4:
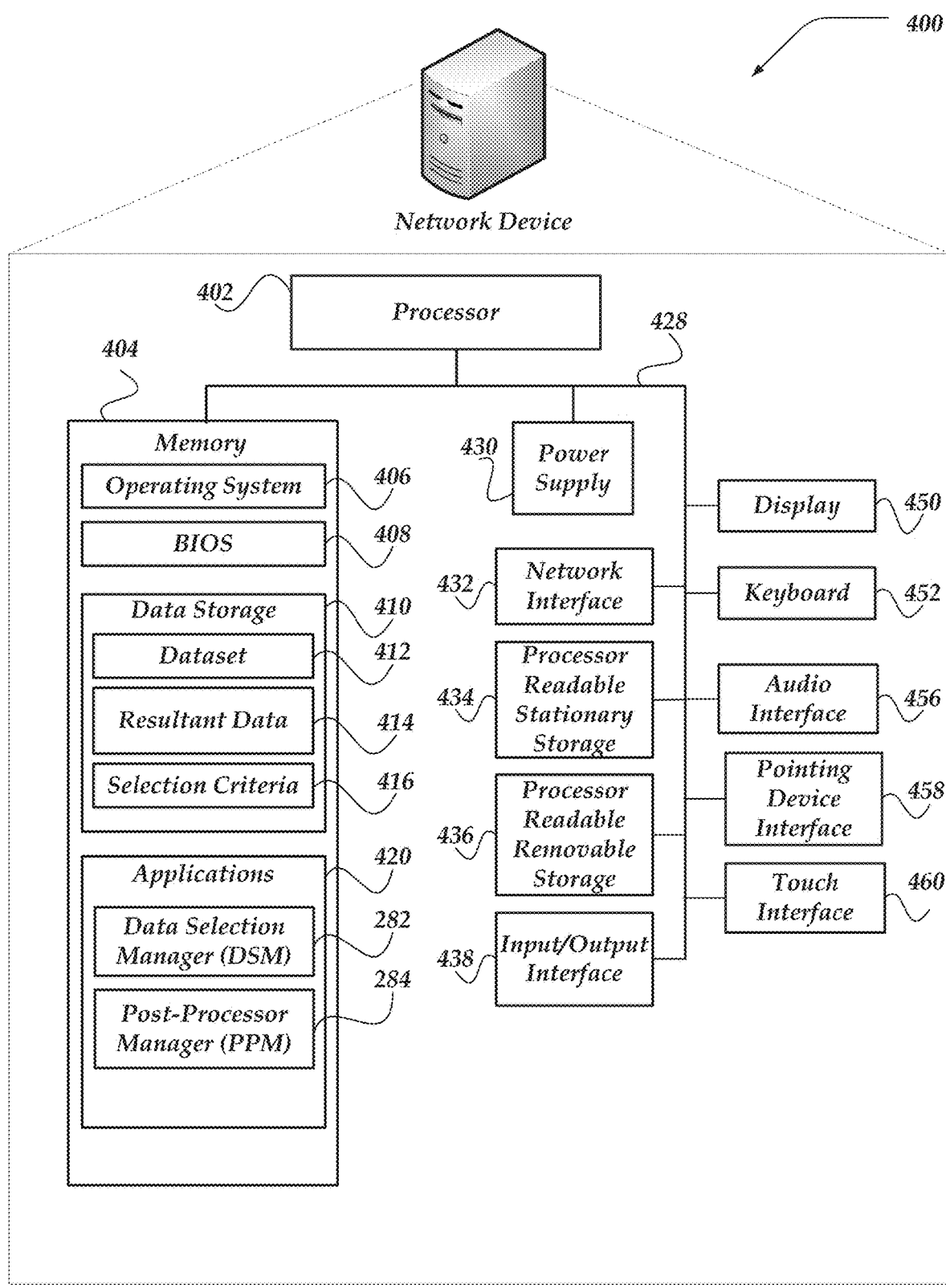
FIG. 4 illustrates a schematic embodiment of a network device.

FIG. 4 shows one embodiment of network device 400 that may be included in a system implementing the subject innovations. Network device 400 may include many more or less components than those shown in FIG. 4. However, the components shown are sufficient to disclose an illustrative embodiment for practicing the subject innovations. Network device 400 may represent, for example, one embodiment of at least one of DSD 112 and/or post-processor server 114 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™ WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOs® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, dataset 412, resultant data 414, and/or selection criteria 416. Dataset 412 represents machine data that is received from one or more other computing devices, such as the client devices illustrated in FIG. 1. Typically, dataset 412 includes unstructured data. Moreover, dataset 412 may be received as streams of records, where each record may include one or more sets of columns, each of which can have more than one value or type of data. Typically, dataset 412 represents large sets of data that may sometimes be referred to a 'big data.' As used herein, the term "big data" refers to a collection of datasets so large and complex that it becomes difficult to process using on-hand database management tools or traditional data processing applications. Big data usually includes datasets with sizes beyond the ability of traditional software tools to capture, curate, manage, and/or otherwise process the data within a cost-effective elapsed time, and/or within a cost-effective use of resources. Sizes for defining big data are a constantly changing. For example, as of 2012, big data was viewed as ranging from a few dozen terabytes to many petabytes of data in a single dataset. It should be noted that while dataset 412 may represent such big datasets of machine data having unstructured data therein, dataset 412 need not reside within a single network device. Thus, FIG. 4 should not be construed as limiting how or where dataset 412 may reside. For example, in some embodiments, dataset 412 may reside across a plurality of different physical (non-transitory) storage devices. Further, it should be understood that while such large datasets create resource constraints, making performing operations on the datasets themselves expensive, dataset 412 need not, in some embodiments, include such big data. That is, in some embodiments, dataset 412 may also include sets of data that are smaller than that of big datasets.

Additionally, as shown in FIG. 4, data storage 410 may also include resultant data 414, which represents a subset of dataset 412 that may be generated as a representative sampling using data selection manager (DSM) 282, and selection criteria 416. Selection criteria 416 represent user selectable, and/or default parameters usable by DSM 282 to generate resultant data 414.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another client device. Other examples of application programs include calendars, search programs, email client applications, IM applications, SMS applications, Voice over Internet Protocol (VOIP) applications, contact managers, task managers, transcoders, database programs, word processing programs, security applications, spreadsheet programs, games, search programs, and so forth. Applications 420 may include DSM 282 and Post-processor manager (PPM) 284.

It should be noted that while FIG. 4 illustrates DSM 282 and PPM 284 within a same network device, subject innovations are not so limited. Thus, for example, in other embodiments, DSM 282 may reside in one network device, while PPM 284 may reside in one or more other network devices. With respect to FIG. 1 for example, DSM 282 may reside within DSD 112, while PPM 284 may reside in Post-processor server 114. However, in still other embodiments, client devices, such as those should in FIG. 1, may include client versions of selection manager and/or post-processor manager. An example of a client device having client versions is shown in FIG. 3. In yet other embodiments, post-processor manager may be distributed across a plurality of different network devices and/or client devices.

In any event, DSM 282 is configured to perform data analysis upon at least some of the data within dataset 412 to generate a variable representative sampling (resultant data 414). DSM 282 is described in more detail in conjunction with FIG. 5. PPM 284 is configured to receive one or more subsets of data from dataset 412, and/or to employ resultant data 414 to perform various operations upon dataset 412 and/or resultant data 414. PPM 284 is described in more detail below in conjunction with FIG. 5.

Generalized Operation

Figure 5:
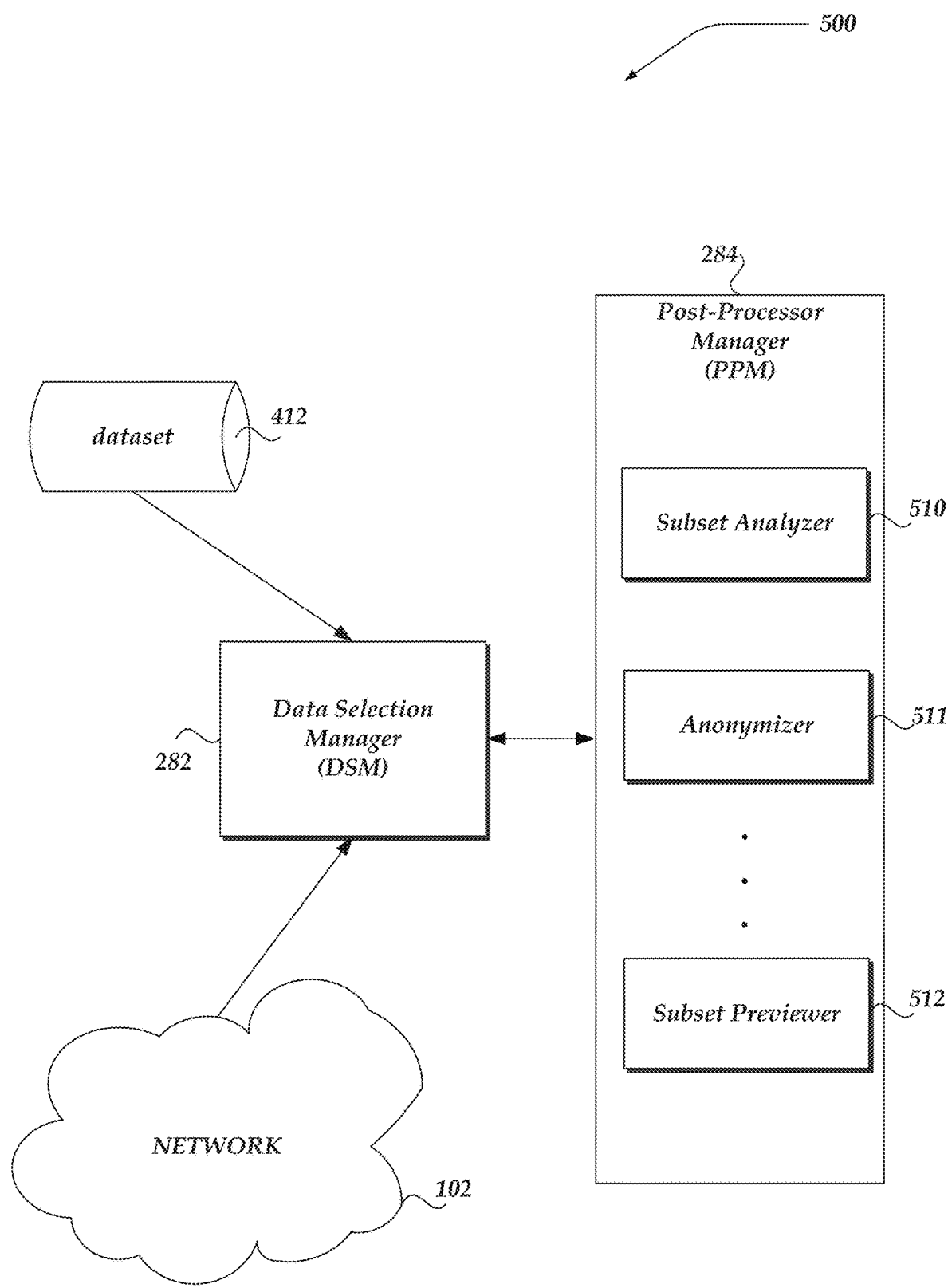
FIG. 5 illustrates one embodiment of an architecture for use in managing variable data selection of a representative data subset from a larger dataset.

The operation of certain aspects of various embodiments will now be described with respect to FIGS. 5-7. FIG. 5 illustrates one embodiment of an architecture for use in managing variable data selection of a representative data subset from a larger dataset. Architecture 500 includes components within network device 400 usable to manage variable data selection and post-processing. Not all of the components shown in FIG. 5 may be required to practice the subject innovations, and variations in the arrangement and type of the components also may be made.

As shown, architecture 500 includes dataset 412, DSM 282, PPM 284, and network 102. Dataset 412, DSM 282 and PPM 284 are briefly discussed above in conjunction with FIG. 4, while network 102 is described above in conjunction with FIG. 1.

As discussed above, DSM 282 is configured to identify a variable representative sampling of data as a resultant subset of data from the larger dataset 412 that includes unstructured data. It is noted that larger dataset 412 may also include structured as well as unstructured data. DSM 282 provides a GUI, which is described in more detail below in conjunction with FIG. 6. Briefly, however, the GUI enables a user to provide various data selection parameters and/or criteria to DSM 282 for use in identifying/selecting records from dataset 412 as the resultant subset. The user may, for example, indicate various types of processing to be performed on at least some of the data within dataset 412 to generate different types of resultant subsets. For example, the user may input parameters/criteria, using the GUI, usable to identify a subset that is based on one or more latest records, earliest records, diverse records, outlier records, random records, and/or combinations thereof. DSM 282, however, is not constrained to these subset types, or combinations thereof, and others may also be included. DSM 282 may employ a process such as described in more detail below in conjunction with FIG. 7 to perform at least some of its actions based in part on the provided input dataset(s) and parameters/criteria.

It should be noted that while a graphical user interface is disclosed herein, other embodiments may employ other mechanisms for enabling a user to perform actions, including, for example, a command line interface (CLI), or the like. Thus, in some embodiments, a CLI might be employed to request a subset to be generated. One non-limiting, non-exhaustive example of such might include a command such as "% makesubset mybigdata.csv>subset.csv." Clearly, other mechanisms may also be used.

Further, the resultant data from DSM 282 may be provided to PPM 284 for use in further processing. It should be noted, however, the PPM 284 need not be constrained to merely operating on resultant data from DSM 282. For example, PPM 284 may, in some embodiments, operate on data obtained from any of a variety of sources, including directly from dataset 412, data received directly from one or more client devices, manually entered data, or the like.

PPM 284 includes various post-processing components, including subset analyzer 510, anonymizer 511, and subset previewer 512. As indicated by the dashes within PPM 284, other post-processing components may also be included, and thus, subject innovations are not constrained to those shown. For example, a sharing component may be included that enables users to post-process and share at least some of the resultant data with one or more other network devices, data stores, or the like. Another component may include a saving component that is configured to save the received data, as well as various extraction rules, data types, column values, filters, parameters, or any combination thereof, to permanent storage for later application of the data.

Subset analyzer 510 is configured to enable a user to perform various post analysis on the subset of data, including, for example, analysis for generation of extraction rules, sorting rules, reporting rules, or even storage rules. For example, using subset analyzer 510, a user might generate an extraction rule for the subset of data that is generated based on the clustering algorithm (e.g., for the outlier and/or diverse subtypes). Subset analyzer 510 may then provide feedback about a percentage of events/records within some or all of the clusters from which data might be extracted using the extraction rule. Other post analysis actions may also be performed, and therefore, subject innovations are not limited by the provided non-limiting, non-exhaustive examples of post analysis.

Anonymizer 511 is configured to enable a user to perform various actions that are directed towards depersonalizing the data. Information within the data that may be construed as Personally Identifiable Information (PII), or otherwise private, confidential, or otherwise for limited viewing, may be modified by anonymizer 511 to remove such data. In some embodiments, because some of the data within the subset is unstructured data, anonymizer 511 may be used to identify the location, type, and filter rules, for anonymizing the data. It should be noted that while anonymizer 511 may operate on the subset data, anonymizer 511 is not so limited. For example, anonymizer 511 may analyze the subset data in order to create anonymizer filters/rules that may then be applied to at least some data within or obtained further from the larger dataset, such as dataset 412.

Subset previewer 512 is configured to employ various extraction rules that may be generated based on an analysis of the received resultant data. The extraction rules may then be used to further extract data from the resultant data subset, or from dataset 412.

Figure 6:
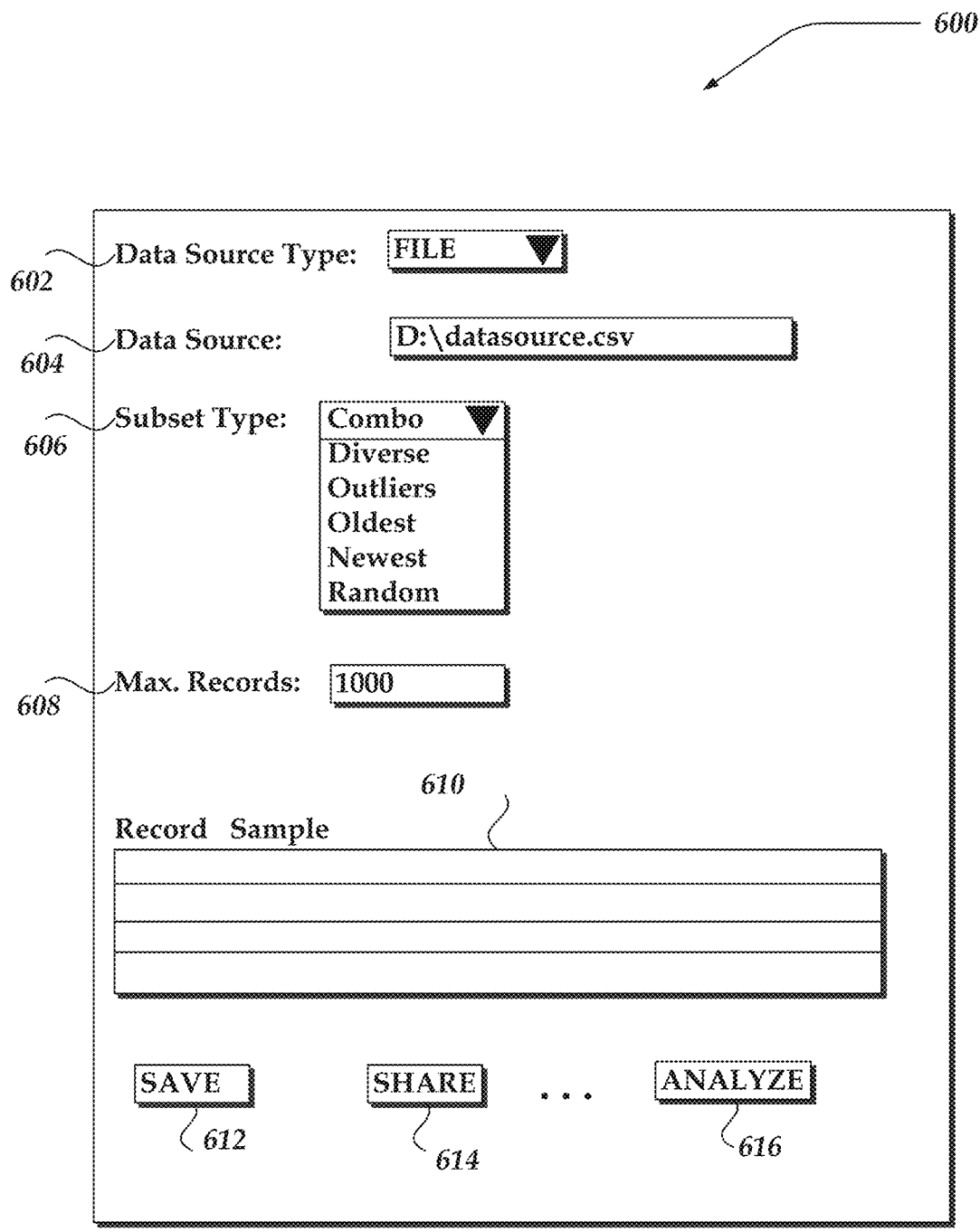
FIG. 6 illustrates one non-limiting, non-exhaustive example embodiment of a graphical user interface (GUI) usable to manage selection of representative data subset from a larger dataset.

FIG. 6 illustrates one non-limiting, non-exhaustive example embodiment of a graphical user interface (GUI) usable to manage selection of a representative data subset from a larger dataset. GUI 600 of FIG. 6 may include many more or less components than those shown in FIG. 6. However, the components shown are sufficient to disclose an illustrative embodiment for practicing the subject innovations. Moreover, variations in the arrangement and type of the components may be made without departing from the spirit or scope of the subject innovations.

GUI 600 may be configured to be displayed by any of a variety of display device components, including within a screen display device usable by various computing devices, including the client devices and/or network devices of FIGS. 1-4 described above. Further, GUI 600 is not constrained by any particular software language, scripting tool, or the like, for generating the display of GUI 600. Moreover, GUI 600 is not constrained to drop down, fill-ins, buttons, or the like, and virtually any other mechanism usable to receive and/or display user parameter/criteria selections may be employed. GUI 600 also may employ any of a variety of input selection mechanism, including, but not limited to touch screens, voice recognition, mouse, keyboard, stylus, or the like.

In any event, as shown in FIG. 6, GUI 600 may include parameter/criteria selections including data source type 602, data source 604, subset type 606, maximum records 608, record sample 610, as well as selections that enable post-processing, such as save selection 612, share selection 614, and analyze selection 616. Data source type 602 allows a user to specify a data source type that may be from a data store, an index of records, a structured file (such as, for example, CSV, XML, JSON files, or the like), from structured network data, or the like. Data source 604 is configured to allow a user to specify a source of the data, which may include, a type of data source (such as from a file, a source of data from that type (such as /var/log/data.csv, or the like), as well as an index name when the source is from an index, database parameters such as connection information, tables, columns, or the like; a network address and/or port when the source is from a network source; a file or directory name when the source is from a file or directory; or the like. Subset type 606 is configured to allow a user to input the desired selected subset types obtained from the data. As such the user may select one or more of diverse subset, outlier subset, oldest record subset, newest record subset, and/or random record subset type. As discussed above, other subtypes may also be provided. Further, as illustrated in FIG. 6, a combination subset type may also be selected. In some embodiments, a default for the combination subset type includes representative subsets from each of the other subset types. However, in other embodiments, a user might highlight or otherwise select combinations of two or more of the other subset types to generate other combinations. Maximum records 608 is directed towards allowing a user to set a limit on a number of records to retrieve, at least initially, from the specified data source. In some embodiments, a user might also be allowed to input a limit on a number of records to display within record sample 610. In some embodiments, record sample 610 might be configured to display samples of records that are obtained from within the resultant subset sampling. However, in other embodiments, record sample 610 might also allow a user to select for display at least some of the records that are used to generate the resultant subset sampling. In other embodiments, there may be an input that enables a user to define other selection criteria that might be usable for example in a filtering query. The input might include keywords, phrases, Boolean expressions, wildcards, or the like. Such selection criteria might then be usable in selecting record samples for display, in selecting records for further processing, or the like.

Post-processing may also be performed using various selectors, including using save selection 612 to save the resultant subset, share selection 614 to share the resultant subset with other devices, and analyze selection 616 to commence further analysis upon the resultant subset, or other data. While these post-processor selectors are illustrated within GUI 600, it should be understood, that they may also be provided through a differently structured GUI. Thus, GUI 600 is not to be construed as limiting the subject innovations.

Figure 7:
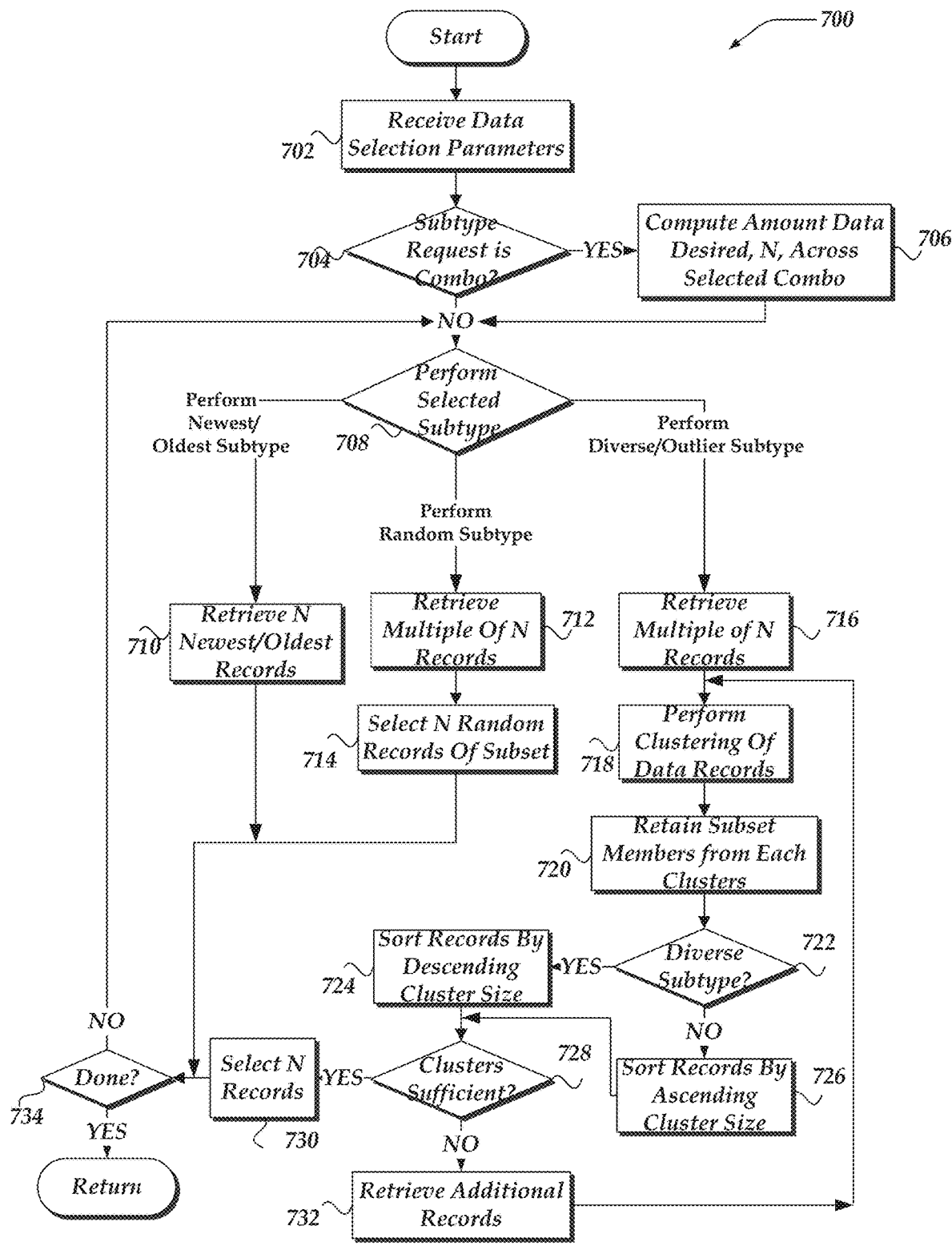
FIG. 7 shows a flow chart of one embodiment of a process usable to manage variable representative sampling of data as a subset from a larger dataset that includes unstructured data.

FIG. 7 shows a flow chart of one embodiment of a process usable to manage variable representative sampling of data as a subset from a larger dataset that includes unstructured data. Process 700 of FIG. 7 may be executed by one or more processors within network device 400 of FIG. 4, and/or through actions performed in part by a client device, such as client device 300 of FIG. 3, or the like.

Process 700 begins, after a start block, at block 702 where data selection parameters/criteria is received. In some embodiments, the data selection parameters/criteria may be received from a user that might employ a GUI, such as described above in conjunction with FIG. 6. However, process 700 is not so limited, and such data selection parameters/criteria may be received using any of variety of other mechanisms.

In any event, the data selection parameters/criteria may include information about a data source, any query constraints, a type of subset desired, and an amount of data desired (N). In some embodiments, the data source might indicate that the input records are to be obtained from dataset 412 of FIG. 4. However, process 700 is not constrained to operating on merely dataset 412, and any of a variety of other datasets may also be employed as input to process 700.

Process 700 moves next to decision block 704, where a determination is made whether the subset type to be used to obtain the resultant subset is a combination subset. As an aside, in some embodiments, a default desired subtype might also be used, when the user elects not to provide a selection. In one embodiment, the default desired subtype might be a combination subset type that includes records from each of the available subset types. In any event, if the subtype process to be performed is a combination subtype, then processing flows to block 706; otherwise, processing flows to decision block 708.

At block 706, the number of records obtained within the resultant subset is computed as a split of the input N, such that records are obtained from each of the subtype processes identified in the combination. For example, if the combination is to be obtained by performing each of the five different processes (newest, oldest, random, diverse, and outliers), then N is, in one embodiment, recomputed as N=N/5. That is, a same number of records are obtained from each of the five subtype processes. However, in other embodiments, other ratios might be used, including obtaining more records from one or more of the subtypes than obtained from at least one other subtype in the combination of subtypes. Processing then flows to decision block 708.

At decision block 708 a determination is made which one or more subtype processes to perform. As noted, more than one of the subtype processes may be performed. For example, all of the identified subtype processes might be performed. Thus, in that instance, processing flows to blocks 710, 712, and 716. Such processing might be performed concurrently. However, in other embodiments, at least some of the selected subtype process might be performed serially.

In any event, when one or more of newest or oldest subtype processes are to be performed, processing flows to block 710. When the random subtype process is to be performed, processing flows to block 712; and when one or more of diverse or outlier subtype processes are to be performed, processing flows to block 716.

At block 710, for newest subtypes, N most recent or current records are retrieved or otherwise extracted from the input set of records. That is, a query might be performed on the data source for the N newest records. For oldest subtype processing, a query of the data source may be performed to retrieve a subset of records that contains N oldest records. Such queries may be performed by searching the data input for a field indicating a time in which the data was received by from a client device for storage. Such field might be added during receipt from the client device, or might be a known location within a record. Where both newest and oldest subtypes are to be obtained, such actions may be concurrently performed within block 710, or performed serially. In either event, processing then flows to decision block 734.

At block 712, a random subtype subset sampling is to be obtained. It should be understood that any of a variety of criteria may be employed to define randomness, including, but not limited to generating a sampling record selection based on a pseudo-number generator, a value obtained from a purely random source, or the like.

In at least one embodiment, for example, records may be retrieved from within the data source a multiple (e.g., 50) of N, the desired returned subset to retrieve. That is ~50*N records might be retrieved from the data source. Then, a random subset N records might be extracted from the 50*N records to generate the random subset. Thus, as illustrated, at block 712, a multiple of N records is obtained. As an aside, it should be clear to one of ordinary skill in the art that any multiple of N might be selected, and therefore, 50 is merely a non-limiting example. Processing then flows to block 714, where N random records are obtained from this extracted subset to generate a random subtype sampling. Processing then flows to decision block 734.

At block 716, for diverse and/or outlier subtypes, a multiple of N records is retrieved from the data source. Again, the multiple may be virtually any non-negative value greater than zero that is directed towards retrieving a whole number of records. Processing then flows to block 718.

At block 718, any of a variety of clustering techniques may be applied to the retrieved records. In some embodiments, the clustering technique used might be an unsupervised clustering technique, where the task is to develop classification and sorting of the records without regard to a predefined number of groups or clusters to be generated. Such unsupervised clustering techniques seek to identify similarities between portions of the data within the records in order to determine whether the records can be characterized as forming a group. Such groups are typically also known as clusters. As noted, any of a variety of unsupervised clustering techniques may be employed, including but not limited to k-means, kx-trees, density estimation, self-organizing map modeling (SOM), adaptive resonance theory models (ART), as well as other feature extraction techniques. Further, the similarity may be based on any one or more fields or portions of data within the records. In some embodiments, the portions used might be predefined. However, in other embodiments, additional analysis might be performed to select which portion or portions of the records to use in creating the clusters. Further, clustering may be based on one or more column values, terms and/or phrases with a value or event independent of a given column, punctuation within column values, or the like. For example, the records may be machine data that is generated by code that generates records with similar punctuations but having different terms. For example, the following three records have different text:

00:02:35, 181 INFO [Processor10] Clickthruy 10.0.0.5—ApplicationID is CA7

00:02:35, 181 DEBUG [Processor11] Subscription 10.0.2.1 Subscribe—678/749/139—

00:02:39, 033 INFO [Processor24] Message 10.0.1.1 MessageOpened—4928/12664—

However, each has similar punctuation:

::, [ ] . . . -

::, [ ] . . . -//-

::, [ ] . . . -/-

While unsupervised clustering techniques are typically directed towards generating one or more clusters from the records, absent knowing a priori a predefined number of clusters to be created, other clustering techniques may also be used. Thus, supervised clustering techniques may also be used, where the number of clusters or groupings might be predefined. In using supervised clustering techniques, in some embodiments, the number, k, of the resulting clusters might be iterated upon, until some threshold criteria are satisfied. For example, a degree of dissimilarity across each cluster is above a threshold, might be used to determine when to stop iterating. The outcome of such iterations might then provide a value for k.

In any event, as noted, block 718 results in the generation of one or more clusters of the retrieved records. At block 718, a number of records in each cluster may vary, thus, at block 718, each cluster may be assigned some identifier, where the identifier is usable to indicate which cluster a record belongs. A cluster size for each cluster and their identifier may be saved.

Continuing to block 720, a subset of the records from each cluster may be selected, based on any of a variety of criteria. For example, each record selected from a cluster may be based on a most similar criteria, or most representative of the cluster, or any of a variety of other criteria. Any number of records from the clusters may be selected. For example, three records may be returned. However, it should be noted that block 720 may, in some embodiments, be optional, and all records for each cluster might be selected and retained for later analysis.

Process flow then continues to decision block 722, where a determination is made whether the desired subtype is the diverse subtype (or the outlier subtype). When the desired subtype is the diverse subtype, processing flow to block 724; otherwise, processing flows to block 726. For combination subtypes that include both outlier and diverse subtypes, processing might flow to both blocks 724 and 726.

At block 724, the clusters are sorted by cluster size in descending cluster size order. At block 726, the clusters are sorted by ascending cluster size order. The result is that the records are sorted based on the cluster size, in most common cluster first for the diverse subtype, and least common records for the outlier subtype. The following provides one non-limiting, non-exhaustive example implementation of such sorting using a search processing language (SPL):

sourcetype=car_reports

| head 25000

| cluster t=0.7 showcount=true labelonly=true field=MYCOLUMN

|dedup 3 cluster_label

| sort 500—cluster_count

| sort—time

Other implementations may also be employed. Therefore, the above example should not be construed as limiting the subject innovations. In any event, the above example search would retrieve the 25000 most recent records, clusters the records by MYCOLUMN, keeps up to three records per cluster, keeps 500 records from the most common clusters (diverse subtype), and then optionally resorts the records into time order.

Process for both blocks 724 and 726 then flow to decision block 728, where a cluster iteration analysis is performed to determine whether the number of clusters are greater than a defined threshold number for the diverse subtype. When the subtype is the outlier subtype, one embodiment might include an 'or' evaluation, of whether the least popular clusters are more common than another threshold. Should the cluster iteration analysis indicate that the number of cluster is not greater than a threshold, or (at least for outlier evaluations) that the least popular clusters are not more common than another threshold, processing flows to block 732, where additional records are retrieved from the data source. In some embodiments, for example, if the initial subset retrieved 100K records, then the process might retrieve an additional 100K records. In some embodiments, if not enough clusters are retrieved, indicating that everything might be fairly homogeneous, then more events can be retrieved until a threshold is met, and there is determined to be sufficient diversity. Processing then branches back to block 718 to continue cluster performance until the cluster iteration analysis is satisfied.

When the cluster iteration analysis is satisfied, at decision block 728, processing then flows to block 730, where a first N set of records are retained. Processing then flows to decision block 734, where a determination is made whether subtype processing is completed. Where the desired subtype processing is the combination subtype, processing might then branch back to decision block 708, until each of the subtypes with the combination subtype has generated a respective N number of records (or weighted number of records), which may then be combined to generate the resultant sampling subset of records. Processing would then be completed, and would return to another process.

As seen above for the diverse subtype, the resulting records may include a few (e.g., three) instances of the most common clusters, and given N records, many diverse types of records may be in the subset, covering a large portion of the types of records likely in the full dataset. For example, given a database of car ownership records in the United States, it may be desired to generate a subset of 500 records that represent the most common cars. By retrieving 100K records, clustering the 500 records by car model (or MPG, weight, cost, or any of a variety of other criteria), keeping three instances of the most common models, the 500 records in the resultant subset would that a majority of the types of cars in the dataset would be represented.

As discussed above, for the outlier subtype, the subset is made up of records from the least common types of records. By keeping the records from the rarest cluster, the resulting records are intended to represent the outlier records. While the goal of the diverse subtype is to represent the most common records (e.g., 95%), the goal of the outlier subtype is to represent the rare (e.g., 5%) or unusual records. To use the same example as above, given a dataset of all car ownership records in the United States, a desire is to generate a subset of 500 records that represent the most obscure cars. By retrieving 100K records, clustering by car model (or other criteria), keeping three instances of the least common models, the 500 records would have uncommon cars. With keeping just about 500 records, most of the most obscure cars are expected to be represented. While this might not find all of the most obscure cars in the full dataset, as this would require processing over the full dataset, it is anticipated to provide a reasonable representative sampling of the outliers.

However, other mechanisms may also be used to obtain outliers, or diverse subtypes. For example, statistical methods may be applied to retain those outlier/diverse records based on a statistical confidence level desired. For example, using various statistical methods, the initial number N of records retrieved might be determined based on a confidence level. Techniques may also be used that include keeping records that have column values outside of a norm in a statistical distribution, such as more than two standard deviations from the mean, or in commonality (e.g., more rate than other values), or the like.

Figure 8:
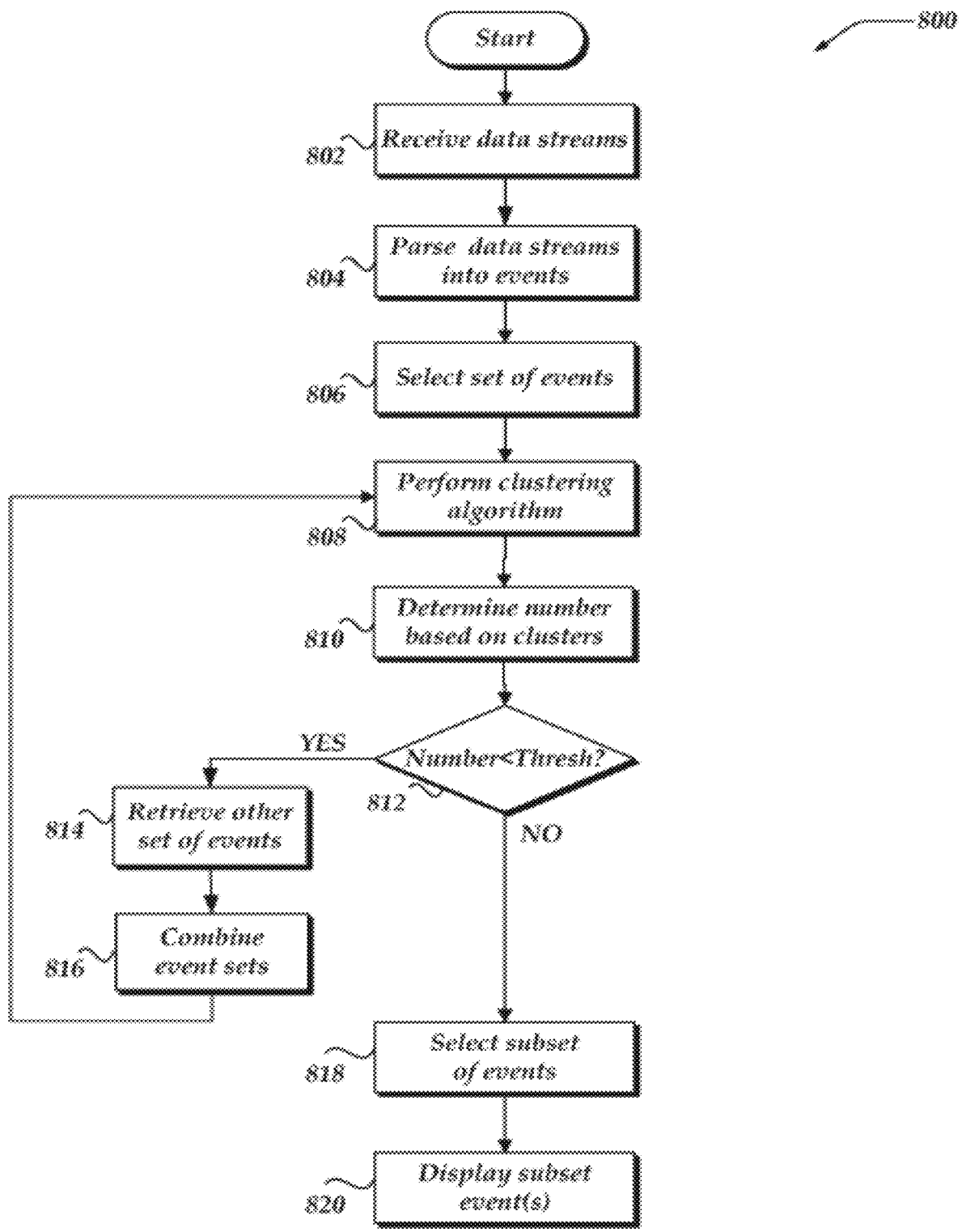
FIG. 8 shows a flow chart of one embodiment of a process for analyzing data.

FIG. 8 shows a flow chart of one embodiment of a process for analyzing data. Process 800 begins, after a start block, at block 802 where one or more data streams are received. At block 804, the one or more data streams are parsed into a plurality events. At block 806, a set of the plurality of events are selected. At block 808, a clustering algorithm is performed on the set of events to generate a plurality of clusters. At block 810, a number is determined based on the clusters. At decision block 812, it is determined whether the number is less than a threshold number. If so, process 800 continues to block 814, where another set of events is retrieved from the plurality of events. At block 816, the set of events and the other set of events are combined to produce a combined set of events. Process 800 then returns to block 808. When the number is determined not to be less than the threshold number, process 800 continues to block 818, where a subset of events are selected from the plurality or second plurality of clusters. At block 820, one or more of the events in the subset are displayed.

As seen above, using the combination subtype would result in obtaining subsets from two or more of the above discussed subtype processes. The number of records in results from each subtype would then total to the desired number of records (e.g. 500). Use of the combination subtype is directed towards enabling a user to test various hypotheses, such as whether there are anomalies in the earliest or latest data, in important common types of records, or in obscure types of records. A combination of subtypes that include random records might assist in making a subset that might be usable for automated tasks, such as validating that patterns match records in the data (e.g., such as might be used for generating extraction rules, anonymizing rules, or the like); that expected records occur, or that expected records do not occur; that the latest data is similar, or not, to the oldest data; or any of a variety of other post-processing analysis.

It will be understood that figures, and combinations of steps in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions execute on the processor to provide steps for implementing the actions specified in the flowchart block or blocks. These program instructions may be stored on a non-transitory computer readable medium or machine readable medium, such as processor readable non-transitory storage media, and the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware-based systems which perform the specified actions or steps, or combinations of special purpose hardware and computer instructions.

The above specification, examples, and data provide a complete description of the manufacture and use of the composition of the described embodiments. Since many embodiments can be made without departing from the spirit and scope of this description, the embodiments reside in the claims hereinafter appended.

We claim:

1. A computer-implemented method comprising:
retrieving a plurality of events from a data source in accordance with a selected data subset type of a plurality of defined, user-selectable data subset types;
identifying similarity between two or more of the retrieved events;
determining whether any of the retrieved events form a group, based on the identified similarity;
selecting, based on a determination that two or more of the retrieved events form a group, at least a subset of the retrieved events that form the group, as a representative data subset; and
causing display of the selected events in a user interface as the representative data subset, wherein causing display of the selected events in a user interface as the representative data subset comprises causing display of the selected events in a user interface that enables development of a field extraction rule that specifies how to extract a value for a field from information in one or more events.

2. The method of claim 1, wherein said determining whether any of the retrieved events form a group comprises applying a clustering algorithm to the retrieved events.

3. The method of claim 1, further comprising:
receiving, from a user, a selection of a data source type from which to generate the representative data subset.

4. The method of claim 1, further comprising:
receiving, from a user, a selection of the data subset type, of the plurality of defined data subset types, for identifying an event to include in the representative data subset.

5. The method of claim 1, further comprising:
receiving, from a user, a selection of a number of desired representative events to be included in the representative data subset.

6. The method of claim 1, further comprising:
receiving, from a user, selections of:
   a data source type from which to generate the representative data subset,
   one or a combination of subset types, of a plurality of defined data subset types, for identifying an event to include in the representative data subset, and
   a number of desired representative events to be included in the representative data subset.

7. The method of claim 1, wherein each of the retrieved events includes raw data indicative of performance or activity of one or more components of an information technology environment.

8. The method of claim 1, wherein the plurality of defined data subset types corresponds to a plurality of subtype processes that include one or more of a diverse event-identification process, an outlier event-identification process, a random event identification process, an earlier event-identification process, or a later event-identification process.

9. The method of claim 1, wherein determining whether any of the retrieved events form a group is part of applying a clustering algorithm to the plurality of events to form a plurality of clusters;
the method further comprising:
   determining that a number of clusters in the plurality of clusters is not of a sufficiently large; and
   clustering a larger group of events in the plurality of events than the group of events.

10. The method of claim 1, wherein each event in the plurality of events is associated with a time stamp.

11. The method of claim 1, wherein each event in the plurality of events is associated with a time stamp that has been extracted from data in that event.

12. The method of claim 1, wherein retrieving events from the data source includes using a process to identify outlier events.

13. The method of claim 1, wherein retrieving events from the data source includes using a process to identify events associated with earliest events in the plurality of events.

14. The method of claim 1, wherein retrieving events from the data source includes using a process to identify events associated with latest events in the plurality of events.

15. A non-transitory, machine-readable storage medium storing instructions, execution of which in a computer system causes the computer system to perform operations comprising:
retrieving a plurality of events from a data source in accordance with a selected data subset type of a plurality of defined, user-selectable data subset types;
identifying similarity between two or more of the retrieved events;
determining whether any of the retrieved events form a group, based on the identified similarity;
selecting, based on a determination that two or more of the retrieved events form a group, at least a subset of the retrieved events that form the group, as a representative data subset; and
causing display of the selected events in a user interface as the representative data subset, wherein causing display of the selected events in a user interface as the representative data subset comprises causing display of the selected events in a user interface that enables development of a field extraction rule that specifies how to extract a value for a field from information in one or more events.

16. The non-transitory, machine-readable storage medium of claim 15, further comprising:
receiving, from a user, a selection of a data source type from which to generate the representative data subset; and
receiving, from the user, a selection of the data subset type, of the plurality of defined data subset types, for identifying an event to include in the representative data subset.

17. A computer system comprising:
a data store to store data; and
a processor coupled to the data store and configured to perform or cause operations that include
   retrieving a plurality of events from a data source in accordance with a selected data subset type of a plurality of defined, user-selectable data subset types;
   identifying similarity between two or more of the retrieved events;
   determining whether any of the retrieved events form a group, based on the identified similarity;
   selecting, based on a determination that two or more of the retrieved events form a group, at least a subset of the retrieved events that form the group, as a representative data subset; and
   causing display of the selected events in a user interface as the representative data subset, wherein causing display of the selected events in a user interface as the representative data subset comprises causing display of the selected events in a user interface that enables development of a field extraction rule that specifies how to extract a value for a field from information in one or more events.

* * * * *